June 25, 1963  P. E. SMITH, JR., ETAL  3,095,569
RECORDER
Filed July 24, 1958  6 Sheets-Sheet 1

INVENTOR.
PAUL E. SMITH & DANIEL P. NORMAN
BY
EZEKIEL WOLF, WOLF & GREENFIELD
THEIR ATTORNEYS.

INVENTOR.
PAUL E. SMITH JR.,
BY DANIEL P. NORMAN
Ezekiel Wolf, Wolf + Greenfield
THEIR ATTORNEYS.

June 25, 1963 P. E. SMITH, JR., ET AL 3,095,569
RECORDER

Filed July 24, 1958 6 Sheets-Sheet 4

INVENTOR.
PAUL E. SMITH + DANIEL P. NORMAN
BY
EZEKIEL WOLF, WOLF + GREENFIELD
THEIR ATTORNEYS.

June 25, 1963  P. E. SMITH, JR., ETAL  3,095,569
RECORDER
Filed July 24, 1958  6 Sheets-Sheet 5

INVENTOR.
PAUL E. SMITH + DANIEL P NORMAN
BY
EZEKIEL WOLF, WOLF + GREENFIELD
THEIR ATTORNEYS.

3,095,569
RECORDER
Paul E. Smith, Jr., Littleton, and Daniel P. Norman, Ipswich, Mass., assignors to Conval Corporation, Cambridge, Mass., a corporation of Massachusetts
Filed July 24, 1958, Ser. No. 750,678
28 Claims. (Cl. 346—74)

The present invention relates to a recorder and in the preferred embodiment to a recorder of the type utilizing a fixed electrode and a rotatable helical electrode between which a moving paper is suitably marked upon energizing the electrodes.

The present invention further provides a recorder and paper for use in conjunction therewith in which both the paper and recorder are quite inexpensive. As a matter of practicality in the use of recorders, where recorders are often used for hours at a time, the cost of the paper upon which the records are made is a very important factor in the choice of the recorders used. Thus, while suitable markings may be obtained by many known existing recorders, these recorders are incapable of being used effectively with inexpensive paper. The paper which ordinarily is used with recorders is impregnated or coated with expensive chemicals. In the present invention, however, the applicants have found that by arranging a pair of spaced electrodes at spaced distances from an inexpensive electrically and thermally non-conductive porous paper impregnated with a selected chemical very satisfactory markings may be obtained while at the same time the paper used costs but a fraction of those papers heretofore known. In this arrangement an elongated electrode is arranged parallel to the axis of a helical electrode with the two electrodes spaced apart. The paper utilized in this arrangement is impregnated preferably with the sodium salt of thiosulphate, bicarbonate or citrate. Of this group, the sodium bicarbonate is considered to be most preferable in view of its exceptionally inexpensive cost. By utilizing electrodes as indicated spaced from the selected impregnated paper and by applying a carefully controlled voltage across the electrodes, a spark discharge may be created between the electrodes causing a hole in the paper. Immediately subsequently a surge of current is passed between the electrodes causing the paper to scorch about the hole, thus leaving a dark mark. This arrangement thereby produces an improved marking technique in which a very localized dark mark may be obtained on the paper without touching it. It is therefore an object of the present invention to provide a recorder and paper in which the recorder has electrodes spaced on either side from the surface of the paper and in which the paper is of a selected quality and impregnation or coating whereby with suitable circuitry localized marking on the paper may be obtained.

It is also an object of the present invention to provide a recorder arrangement having an improved circuitry adapted to provide an effective method of marking the suitable recording paper by first perforating or puncturing the dielectric type recording paper by means of a high voltage applied across electrodes spaced from the paper. This initial perforation is accomplished by means of circuit preferably including a transformer having a high turns ratio (a 300:1 step-up transformer from an input having a capacity of approximately 20 volts and one ampere has been used satisfactorily). This voltage surge immediately triggers a high surge of current from an independent source which passes through the path established by the voltage surge. This current surge causes a darkening of the area about the perforation. An independent or auxiliary source for providing the high current is dictated by the very severe design specifications imposed upon the transformer as the substantial initial voltage surge dictates a small current flow from the transformer. This independent or auxiliary source which may be termed an intensifier circuit, which reinforces the current flowing in an arc after the arc has been intiated by a separate triggering circuit, has certain advantages which make it possible to achieve the desired marking with practical and useful electrical elements.

As will be explained more fully hereinafter, the circuits, consisting of preamplifier, sawtooth generator, comparator, and a pulse amplifier act together to produce a pulse at a controlled instant of time which corresponds to a certain specific location of the point of intersection of the electrodes. A second pulse amplifier and the intensifier circuit must work in a cooperative manner so as to use this pulse to initiate a discharge between the electrodes which is so reinforced as to render a visible mark on the surface of the paper. The power level of the preamplifier, sawtooth generator, comparator and first pulse amplifier is very low—making it possible to use the most inexpensive and readily available and small component parts. The second pulse amplifier is used to produce a pulse of several thousand volts at very low current. This pulse triggers the arc which is subsequently reinforced by the intensifier current. The current flowing during the marking or darkening portion of the arc cycle flows across an arc voltage of from 10 to 20 volts. The current flowing from the intensifier through the arc is of the order of 2 to 4 amperes. Thus, it will be noted if it were necessary to furnish all this current from the transformer (in the absence of an intensifier) it would require a current of between 600 and 1200 amperes from the second pulse amp. flowing in the low-voltage winding of the pulse transformer. Such a current level is utterly impossible to obtain in any manner which would be practical for the recording uses considered. The size, weight and cost of elements capable of this current rating would render the entire proposal completely impractical. The use of the intensifier circuit as a source of larger currents at very low voltages makes it unnecessary to place such demands upon the transformer in the second pulse amplifier and used in the fashion described the intensifier acts as an energy source which is controlled by the triggering action of the second pulse amplifier. Utilized in this manner a small burst of energy can initiate the discharge of a vastly greater surge which brings about the desired effect.

It should be understood that the initial spark discharge does not ignite the paper and the impregnating materials in the paper do not act as flame retardents. As implied above, it is believed that the initial high voltage discharge punctures the electrically non-conductive paper thereby volatilizing as free ions or radicals the readily ionizable compounds used to impregnate the paper. These free ions apparently provide a carrier for the secondary discharge of high current with the current of sufficient magnitude to pyrolyze the paper around the previously punctured hole.

Further, the present invention contemplates a recorder of the type described in which the electrodes comprise a rotatable helical electrode and a fixed bar electrode arranged with parallel axes, whereby current passing between the electrodes may be localized so as to obtain a very well defined marking. The utilization of a helical electrode has certain fundamental advantages in the present arrangement over the pen or stylus type of recorders.

Many or most recorders use some sort of a moving element which touches the paper in order to write thereon. This includes recorders of the pen-and-ink variety, the heated-stylus type, and the mechanical-stylus-type (wherein a stylus scratches away a surface coating or otherwise marks a pressure-sensitive paper). This contact causes a frictional force to exist which acts so as to oppose pen or stylus motion. In order to overcome this frictional force it is necessary to introduce an added increment of recorder input signal. This added input represents an error, since it requires that the input change by a certain amount without a corresponding motion of the pen or stylus. This effect is sometimes termed a dead-spot or a hysteresis error. When the input signal is cyclically varied the error shows up in the following way. At a certain time the recorder input will have a value, $I_1$, and the output record will be $O_1$. Subsequently the recorder input is increased to larger values, followed by the output. Next the input is stopped and then slowly decreased until the value $I_1$ is again reached. At this instant the output will be at a value $O_1 + 2D$ where D is the hysteresis, or $2D$ is the total dead-spot.

In the helical type recorder the only thing which marks the paper is a massless spark passing between electrodes spaced from the paper which is incapable of experiencing any such mechanical frictional effect. Therefore the hysteresis or dead-spot errors are completely eliminated. In similar fashion the fact that the spark itself is massless means that there is no time required to move the location of the spark from one point to another at the other end of the helix beyond the interval needed to terminate the arc and initiate a new arc; these latter time intervals being very small in comparison with the time needed to accelerate the mass of a typical pen or stylus from one side of a paper to the other. These advantages accrue because of the use of a massless, frictionless spark to produce the visible mark on the paper and distinguish this type of recorder from the class cited above.

Fundamentally, the present invention provides an efficient and inexpensive means of recording physical variables which may be measured proportionately in voltages.

The present invention contemplates usage and application in a great variety of fields including, but not necessarily limited to, the field of depth sounding measurement, seismic applications, viscosity recordings wherein the time for some calibrated object to fall in a test material is measured, and production time recording where the time for a given count of objects to pass a test point is a direct measure of production rate.

Thus, the present invention also contemplates an arrangement in which a recorder and paper combination of the type described may be utilized in a tracking system of the radar or sonar type. In such an arrangement the originating position and target position may be continuously tracked and marked without utilizing conductive or inductive means through the paper other than a spark between electrodes on either side of the paper on which the recording is made.

The invention also contemplates the usage for testing low frequency audio oscillators or the like over reasonable ranges of frequencies in which frequency deviations from a selected norm in the range of $\frac{1}{10}$ of 1% may be graphically and permanently displayed with a marking line deviating for example from a selected norm at a slope in the range of 20%.

In each of these applications, the time at which the moving point of intersection begins, its linear motion, hereinafter called the "origin," is quite important. By "the point of intersection" is meant the point at which the fixed electrode is closest to the edge of the rotatable helical electrode. At this origin a pulse is produced at the recorder with the pulse being used to initiate some phenomenon whose duration time is measured. At the end of the phenomenon a pulse is produced by the measuring device which is then used to operate the recorder circuitry so as to produce a spark at the point of intersection. Since the distance the point of intersection moves from the origin is proportional to elapsed time, successive locations of recorded marks will be a function of said duration time and hence of the variable being investigated.

The present invention also contemplates an arrangement in which a multiplicity of copies of the recordings may be simultaneously made by passing between the electrodes multiple layers of the recording paper.

The present invention also contemplates the usage in ordinate and abscissa plotting devices, particularly where either the ordinate or obcissa quantity varies at a very rapid rate compared with the other of the ordinate or abcissa.

These and other objects and advantages of the present invention may be more clearly understood when considered in conjunction with the accompanying drawings in which.

Figure 2:
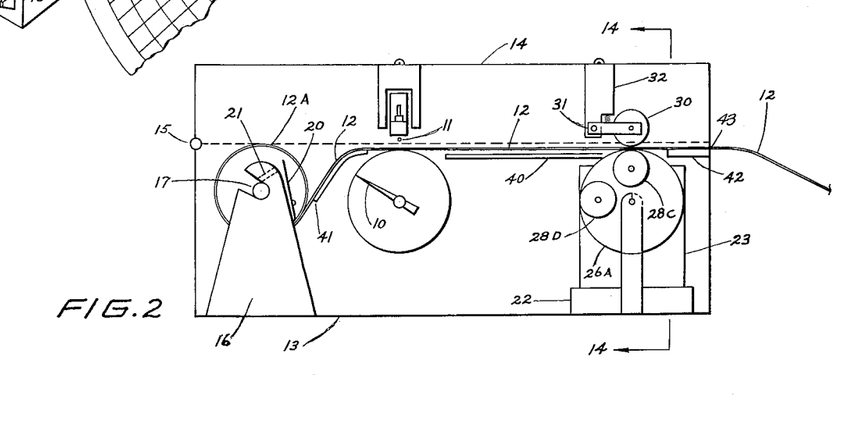
FIGURE 2 is a somewhat schematical cross sectional view taken along the line 2—2 of FIGURE 1.
Figure 2A:
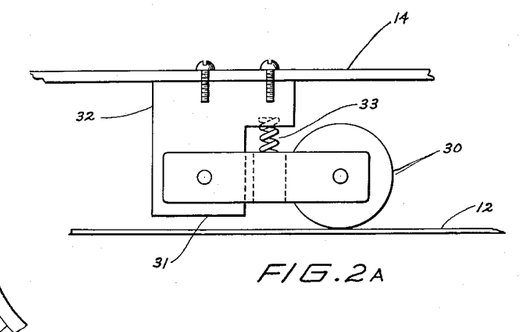
FIGURE 2A is a detail of FIGURE 2.

In the preferred form of the invention, there is employed a helical scanning electrode and a fixed elongated electrode respectively indicated at 10 and 11 in FIGURE 2, between which an elongated length of paper 12 is moved for marking. This basic assembly is contained within a box base 13 and cover 14, preferably hinged along one common edge as at 15. Within the box comprising the base 13 and cover 14, there is secured a paper roll mount 16 on which a roll 12A of the paper 12 is mounted. The core of the paper roll 12A rests in slots 17 of the mount 16 at either end. The roll is normally secured in position by a leaf spring 20 secured at one end to the mount and at the other bearing against the top of a pin 21 which in turn holds the core of the roll in position against the normal pull of the paper as it is moved through the recorder. The paper is drawn through the box by a drive assembly located at the forward end of the box. In this assembly (FIG. 2A) there is provided a motor and gearbox 23 mounted on a support 22. Shaft 24 from the gear box has mounted on it gears 25A and 25B of different sizes. Two other gears of different sizes mesh respectively with gears 25A and 25B. These gears 25c and 25d are mounted between two interconnected plates 26A and 26B mounted on shaft 27. A handle 28 is mounted externally of the box on the shaft 27. Coaxially secured to the gears 25c and 25d are frictional wheels 28C and 28D, adapted to be selectively moved into frictional contact with the paper 12 which moves over the surface of these wheels. This selective movement is controlled by the speed change knob or handle 28. A spring loaded ball or pin engaging a sprocket with notches to receive the ball or pin, of conventional design (not shown) may be incorporated on plate 26A for the purpose of properly selectively aligning the frictional rollers with an upper idler wheel 30 which is positioned above the paper 12 and adapted to bear against it. This wheel 30 is axially mounted on a shaft in turn journaled at the end of the arm 31. The arm 31 is mounted for pivotal movement over a limited distance from the housing block 32 in turn secured to the box cover 14. A spring 33 positioned between the housing block 32 and one leg of the arm 31 presses the idler wheel 30 to compressive contact within the upper surface of the paper 12. The selective position of engagement with the paper 12 of the wheels 28c and 28d is directly below the wheel 30, whereby when the cover 14 is closed, an engaging drive means between the upper idler wheel 30 and lower selected wheel 28c or 28d through actuation of the motor 23 is provided. It will be noted that two selected speeds are provided by virtue of the two wheels 28c and 28d. It should be understood however that additional wheels may be utilized if additional speeds are desirable.

Figure 1:
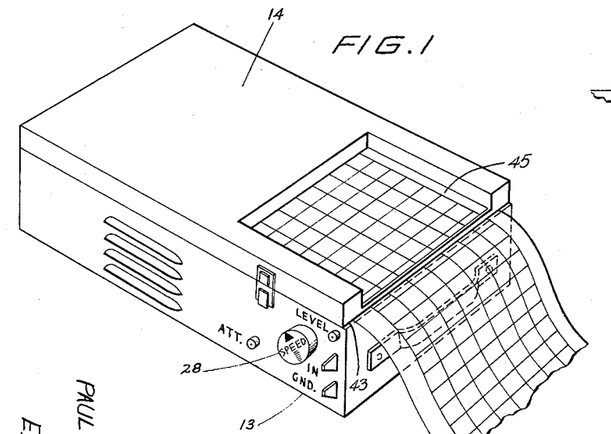
FIGURE 1 is a perspective view of the recorder in a preferred form.

Suitable platens 40, 41 and 42 comprising, for example, flat plates secured to the base 13 and transversely across it are provided as paper guides over which the paper 12 is moved. This paper, as indicated, is drawn at a selected speed from the roll 12A on the paper roll mount 16 to and through a slot 43 at the forward end of the box. For convenience the box may be shaped as illustrated in FIG. 1 with an open portion in the cover 14 forming a window-like opening 45 for ready observation of the data being recorded. The fixed electrode 11 and paper drive idler wheel 30 may all be mounted in the cover 14 while in the base 13 may be mounted the paper transport assembly including the motor 23, the scanner electrode mounts (FIG. 4), the scanner, the electronic circuitry and paper drive motor. In addition, the power supply transformer for the electronics and the power supply components may be located within the base. Also desirable is a safety switch connection between the cover and base which disconnects all of the power and shorts the power supply capacitor when the cover is open. Conventional hardware may be utilized for this purpose.

Figures 3, 5:
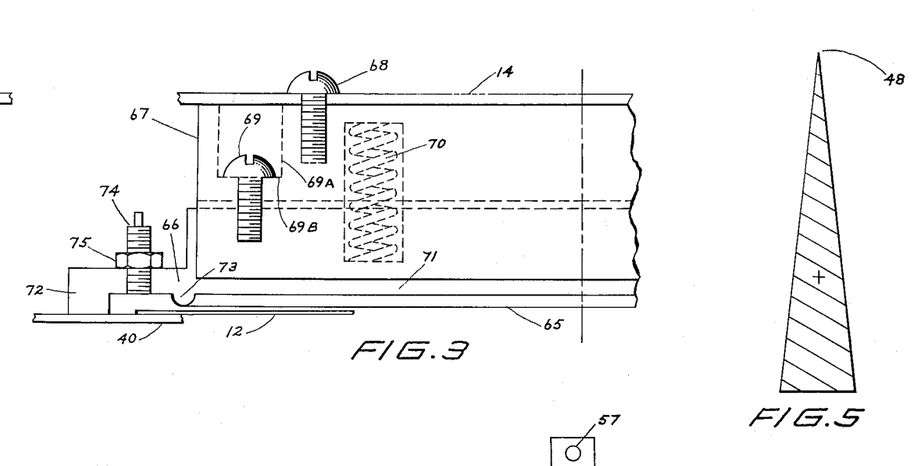
FIGURE 3 is a side view of the fixed electrode and associated assembly.
FIGURE 5 is a detail of the scanning electrode taken substantially along the line 5—5 of FIGURE 4.
Figure 4:
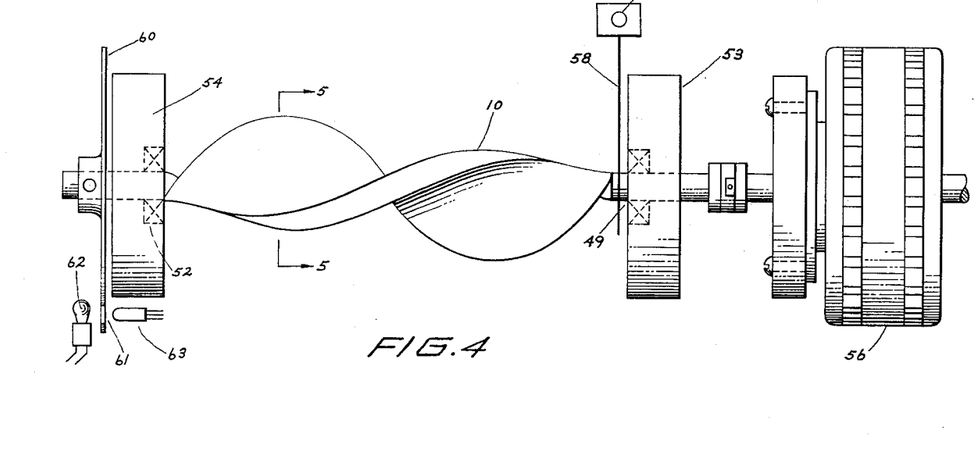
FIGURE 4 is an elevational view of the scanning electrode and associated assembly.

The scanning electrode assembly which is shown in FIG. 4 includes a scanning electrode 10 formed of a single turn screw or helix cast and/or machined from aluminum, bronze, iron or other conductive material, having a cross section as shown in FIG. 5. This electrode is triangular in cross section and has a rather sharp and well defined edge 48. The longitudinal axis of rotation is coincident with the center of gravity of the triangle. The axis or shaft of the electrode 10 is journalled in bearings 51 and 52 at its end. These bearings are in turn secured in bearing mounts with the bearing mounts positioned and secured within the base 13. A drive motor 56 is preferably axially connected to the electrode 10 by means of suitable coupling. This drive motor 56 is designed to rotate the electrode 10 at a carefully controlled and uniform speed. Power is supplied to the electrode 10 through a terminal 57 conductively connected to the contact spring 58 which bears against shaft 49. It may be noted that the helical electrode is grounded and the purpose of contact spring 58 is to avoid the necessity of electrical current from passing through the bearings 51 and 52. At one end of the shaft 49 there is secured by suitable means a disc 60 having an opening 61 near its edge. A light source 62 and photo-transistor 63 are mounted on opposite sides of the disc 60 in position adapted to be aligned with the opening 61. This particular arrangement is utilized in connection with initiation of the scanning pulses, the particular operation of which will be further described in connection with the electronic circuit.

Figure 3A:
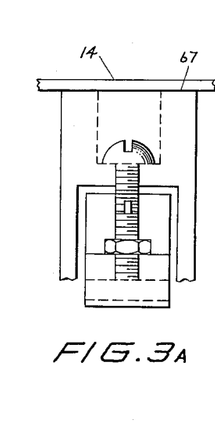
FIGURE 3A is a detail of FIGURE 3.

In the cover of the box the fixed electrode is mounted in an assembly as shown in FIGS. 3 and 3A. In this arrangement there is provided an electrode holder 66 slidably mounted in an inverted substantially U-shaped mounting piece 67. The piece 67 is secured to the cover 14 by screws 68 threaded through the cover 14 into piece 67.

The electrode holder 66 slidably positioned between opposite walls of the piece 67 is limited in vertical movement by securing and guide screws 69, the heads of which are slidably retained within vertical passages 69a having shoulders 69b formed in piece 67. The lower ends of these screws 69 are secured in electrode holder 66. The holder 66 is pressed downwardly by springs 70 positioned in aligned recesses formed in holder 66 and piece 67.

The holder 66 is an elongated holder and has a transverse section 71 terminated in legs 72 at either end. A pair of bosses 73 are formed on the lower surface of section 71 and project downwardly to a plane parallel to and above the plane of the bottom of the legs 72.

The electrode wire 65 is stretched longitudinally parallel to the section 71 and over the bosses 73. It is secured at its ends by passing the wire through a hole in section 71 and suitably securing each end of the wire to a screw 74. The screws 74 are free to slide in the hole through which the wire passes. Adjustment of tension is provided by tightening or loosening nuts 75 threaded onto the screws 74.

The purpose of this arrangement is to maintain the wire at a precise distance above the paper when the cover is closed. It will be noted that the spacing between the plane of the boss and bottom of the legs is greater than the thickness of the paper used so that the paper is never touched by the fixed electrode 11. A suitable and normal spacing between the planes is approximately .003" greater than the paper being used.

The helix electrode, it will be noted, should also be spaced from the lower surface of the paper. Here a suitable distance of the edge of the helix from the lower surface of the paper is approximately .005".

Figure 12:
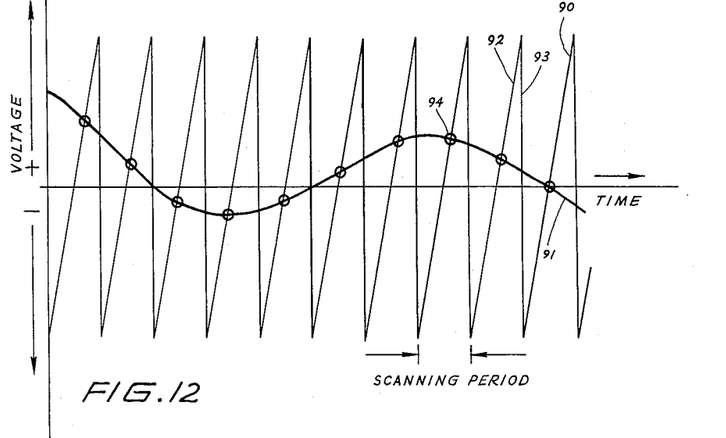
FIGURE 12 is a voltage wave form diagram used in the description of the operation of the present invention.

The arrangement described may be utilized in conjunction with electronic circuitry which periodically scans with a saw-tooth wave a voltage which is to be recorded. This scanning voltage is graphically illustrated in FIG. 12 at 90 while the voltage to be recorded is indicated at 91. The scanning voltage comprises a positive slope 92 which may be termed the scanning voltage and a falling voltage 93 which may be termed the fly-back voltage. The scanning electrode 10 is rotated in time synchronism with this scanning voltage so that the closest point of approximation between the helical scanning electrode and the elongated fixed electrode moves along the fixed electrode in time synchronism with the scanning voltage. Consequently, this point of intersection moves transversely to the recording paper as the paper is drawn at a uniform speed between the two electrodes with this movement in timed synchronism with the saw-tooth wave 90. By the electronic circuitry to be described, whenever the portion of the scanning voltage equals in value the voltage to be recorded, a pulse of voltage is produced. This pulse of voltage is applied to the electrodes. At this instant a spark is produced between the electrodes which pierces the recording paper. The hole which is thus formed is at a distance from the point of origin of the scan on the recording paper which is proportional to the size of voltage which is recorded. The hole which is formed does not in and of itself satisfactorily mark the paper for it merely forms a hole. A suitable darkening of the area immediately about the hole is substantially immediately produced, by means of additional circuitry to be described which intensifies the arc and thereby increases the current passing through the hole. This substantial increase in current for a very short period of time, scorches the specially treated recording paper thereby producing a darkened mark. Since the scanning electrode is moving quite rapidly, the arc through which the intensified amount of current must pass increases in length quite rapidly, at the same time, the current is decreased by the circuitry utilized. Because of this, the arc is quickly extinguished and the area of darkening is localized to the area immediately adjacent the hole. This process repeats on every rotation of the helical scanning electrode, thereby producing a succession of darkened spots on the recording paper, which corresponds with the voltage to be recorded.

Figure 6:
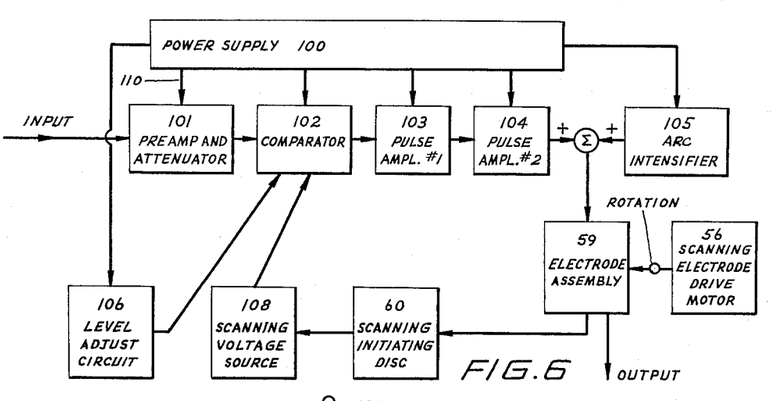
FIGURE 6 is a block schematic diagram of the circuitry of the present invention in preferred form.

The electronic circuitry is shown in block diagram in FIG. 6. In this arrangement a suitable power supply 100 is operatively connected to a preamplifier 103 and a second pulse amplifier 104, as well as to an arc intensifier 105 and level adjustment circuits 106 to provide selected D.C. voltages and current. An input signal in the form of a voltage to be recorded is fed into the line 107 into the preamplifier and attenuator 101 where after suitable amplification or attenuation it is fed into the comparator 102. The comparator also receives voltage signals from the level adjustment circuit supplied from the power supply 100. An additional signal is fed into the comparator from the scanning voltage source 108. When the amplified signal from the input 101 as modified by circuit 106 equals the voltage derived from circuit 108, a pulse is produced by the comparator. This pulse is fed through the amplifier stages 103 and 104. The output signal from amplifier 104 is then fed into the electrode assembly, and in particular to the electrodes 10 and 11, where a spark of sufficient magnitude is created to puncture the paper between the electrodes. Immediately following this a surge of current from the arc intensifier circuit 105 passes between the electrodes and darkens the area about the hole formed by the initial arc. A second dot is then formed on the next revolution of the helical electrode at a distance dependent upon the parameters of the particular device and the input signals to be recorded. Each of the elements represented in FIG. 6 will be considered individually in connection with the detailed schematic drawings of these elements, showing an illustrative embodiment of the preferred form of circuitry utilized.

The power supply 100 may be of conventional type including a power transformer, suitable rectifier diodes, capacitors, resistors and regulating Zener diodes suitably arranged to produce the following voltages suitable for the specific embodiments herein disclosed; 40 milliamps of current at 33 volts D.C. are supplied to the pulse amplifiers 103 and 104 and the comparator 102; 1 milliampere at plus 20 volts is supplied to pulse amplifier 104; 7 milliamps of current at plus or minus 12 volts D.C. are supplied to the scanning voltage source 108; 50 to 100 milliamps are supplied to the arc intensifier 105 at 450 volts D.C.; 10 milliamps at plus or minus 10 volts D.C. are supplied to the preamplifier 101. Additionally, conventional filamentary supply voltages as required should be connected to the circuit in a conventional manner.

Figure 7:
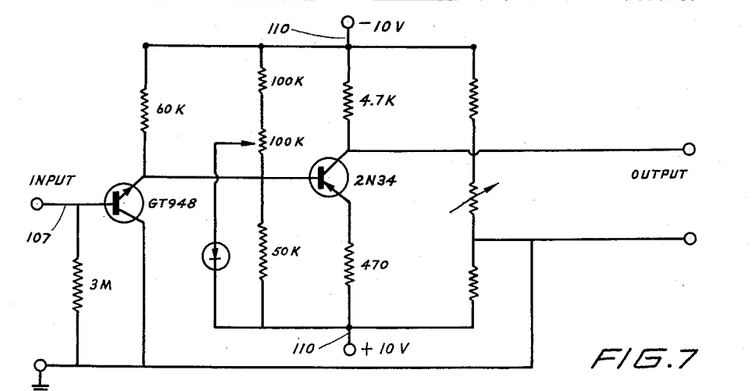
FIGURES 7, 8, 9, 10 and 11 are details of the schematic diagram shown in FIGURE 6.
Figure 8:
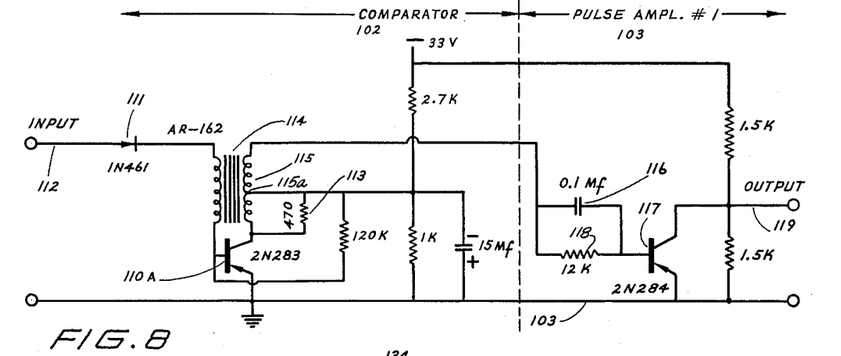

The preamplifier 101 may be of conventional design although a preferred form is shown in FIG. 7 where a voltage gain of 10 is obtained. In the arrangement illustrated there is provided a two-stage amplifier, an N-P-N transistor in the first stage and a P-N-P transistor in the second stage. The transistor of the first stage is in the common collector connection while that of the second stage is in the common emitter connection. The other circuit parameters are illustrated in the drawing and include a connection 110 to the power connections. The comparator circuit is illustrated in FIG. 8. Here the input 112 is the algebraic sum of the scanning voltage, the level changing voltage and the amplified voltage which is being recorded. When this input voltage 112 becomes positive, the comparator circuit operates so as to produce a sharp pulse at its output. The circuit acts in the nature of a blocking oscillator, with the circuit being adjusted to be unstable with a positive input voltage. When the input voltage becomes positive, the input diode 111 conducts, thus reducing the input circuit impedance. This also initiates the cut-off of transistor 110A. Upon the continuing conduction of the input diode 111, there is a positive feedback through the lower half of the transformer 114 which reinforces the oscillation which drives the transistor to cutoff. A pulse occurs when the transistor 110A switches from being "on" to being "cut off" during the initial swing of oscillation. This pulse occurs across the upper half of transformer 114 due to transformer action when the voltage from point 115A to ground increases as a consequence of the transistor 110A being driven into cutoff. The output pulse produced is positive going. Unless certain adjustments are made, the transistor would not remain cut off indefinitely but would return to the "on" stage after a certain period of time has elapsed. It would then produce a second undesirable pulse unless the positive input has become great enough to keep the transistor cut off. The time interval during which the transistor remains cut off is a function of the resistor 113 connected across the lower half of the secondary 115 of the transformer 114, in combination with the leakage inductance of the transformer 114 and the transistor cut-off frequency. If the parallel resistor 113 is made small enough the oscillation can be overdamped. By this means the tendency of the transistor to turn back on again can be delayed until the positive going input becomes large enough to complete cutting-off the transistor. The transistor is turned on again during the scanning voltage fly-back. It remains on until the comparator again becomes positive. At this time the sequence repeats.

The pulse amplifier 103 is connected in cascade with the comparator 102 through the 0.1 mfd. capacitor 116. The amplifier transistor 117 is of the P-N-P variety with a proper D.C. base bias obtained for the transistor through a 12K resistor 118. This bias keeps the transistor on except when a positive pulse is received from the comparator circuit at which time the transistor is cut off momentarily thereby producing a negative pulse at its output 119.

Figure 9:
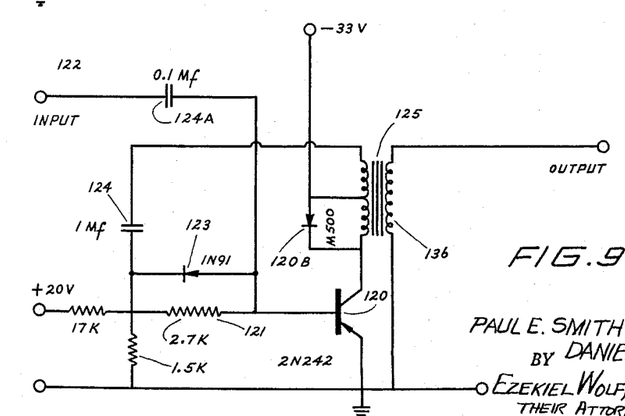
Figure 10:
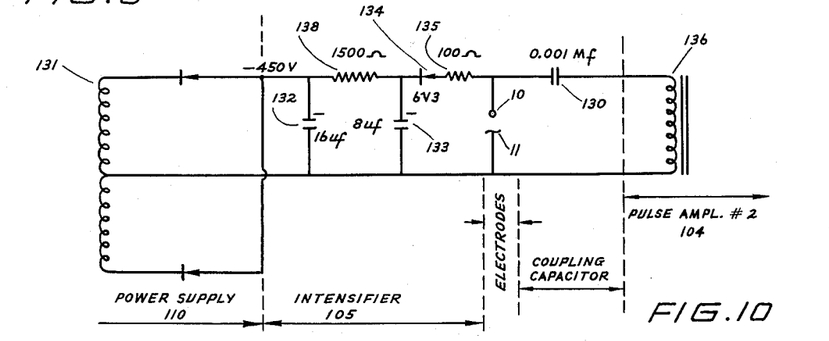

The pulse amplifier 104 shown in FIG. 9 is connected in cascade with the amplifier 103. Here the transistor 120 is maintained cut-off except when a pulse is produced by amplifier 103 by means of the current through the 2.7K resistor 121 connected in series with the base of the transistor 120. The transistor is cut off until a negative pulse is received from the pulse amplifier 103 through the input 122. This pulse causes the transistor 120 to begin to conduct in its forward direction, thereby initiating a change at the output. This change in output is regeneratively coupled back to the base of transistor 120 from the upper half of the primary of transformer 125 through the capacitor 124 and the diode 123. This tends to draw still more current from the base, thus aiding the original causative input derived from 122. In this manner the pulse is further sharpened so that the resultant output pulse delivered from the secondary of transformer 125 has a fast rising front. The pulse thus produced at the output of the transformer 125 is connected across the electrodes 10 and 11 where an arc will occur. The rectifier 120B allows the current which flows during the initial pulse to continue to decay after the transistor returns to cut-off condition, thus preventing damage to the transformer due to inductive voltages that would result if the transformer current were suddenly terminated. The pulse is connected to the electrodes through the coupling capacitor 130 (FIG. 10). The transistor 120 is returned to cut-off after the aforementioned pulse is produced due to the application of a positive pulse at the base of transistor 120 which pulse is derived from the trailing edge of the pulse received from amplifier 103 by means of the 0.1 mfd. coupling capacitor 124A in conjunction with the transistor base resistance. Thus, the combination of capacitor 124A and transistor base resistance acts as a differentiating circuit to respond to the slope of the input pulse.

The arc intensifier shown in FIG. 10 is connected to the power source by means of the transformer 131 which applies 450 volts across the parallel capacitors 132 and 133. The capacitor 133 is connected across the electrodes 10 and 11 with a series arrangements of a resistor and diode 135 and 134 respectively, in series with one terminal of the capacitor 133 and the electrode 10. As previously indicated, the pulse amplifier 104 is connected through the transformer secondary 136 and series capacitor 130 to the electrodes 10 and 11. Therefore, when a pulse is produced by the amplifier 104, it is coupled through the capacitor 130. This capacitor 130 has previously been charged with its left side negative. The pulse voltage added to this charge voltage is sufficient to cause a spark to start which punctures the paper. The capacitor 130 immediately discharges through the arc and the voltage across the capacitor thereby falls to a low value. Simultaneously the arc voltage drops to the "arc sustaining voltage." This allows the diode 134 to conduct in its forward direction allowing condenser 133 to discharge through the arc. The current through the arc is therefore controlled by the discharge of capacitor 133 as well as the resistors 135 and 138. The current which passes through the arc thereby tends towards a value of $450/(R_{138}+R_{135})$. $R_{138}$ is made much larger than $R_{135}$, so that the current is reduced to a low value soon after it begins to flow. The initial value of the current however is quite high, that being $450/R_{135}$. This is due to the fact that before the arc occurs the capacitor 133 was charged to 450 volts. In the meanwhile the scanning electrode continues to rotate drawing the spark through the hole in the paper out into a larger length. At the point where the current is low enough so that the arc of increasing length cannot be maintained the arc extinguishes. Subsequently capacitor 133 charges through resistor 138 and capacitor 130 charges through resistor 138 and the diode 134, thus resetting the conditions for repeating the cycle. At the end of the charging period no current is flowing and the circuit is ready for the next pulse.

Figure 11:
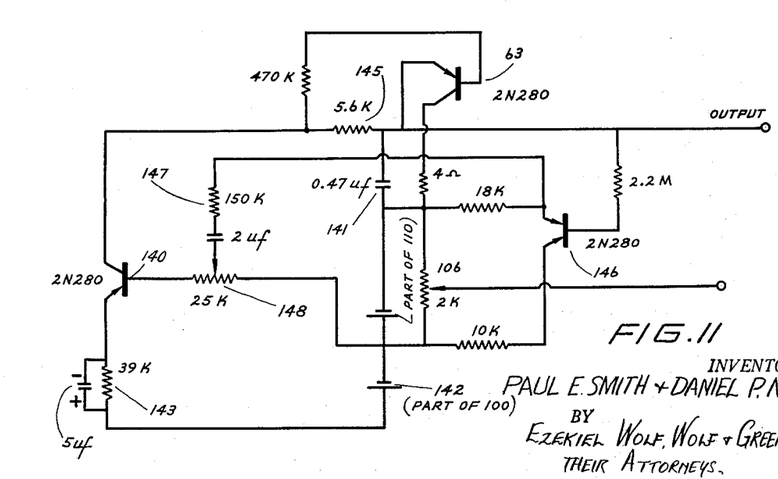

The scanning voltage source illustrated in FIG. 11 provides a saw-tooth voltage input to the comparator. In this arrangement the transistor 140 controls the current which flows into the capacitor 141. Disregarding for a moment the linearity potentiometer, the transistor 140 acts as a current source with the emitter current being determined by the 12 volt battery 142 connected across the base and emitter and in series with the resistor 143. The collector current is approximately equal to the emitter current and flows into capacitor 141. The voltage across 141 accordingly rises at a constant rate until transistor 63, a photo-transistor, which has been held non conducting by the drop of the 6K resistor 145 is made to conduct by light from the scanning light 62 (FIG. 4) which shines on it through the hole 61 in the scanning disc 60.

As the disc is fastened to the rotating electrode this action occurs once every revolution of the electrode. When the transistor 63 conducts it allows capacitor 141 to discharge. As soon as the slot in the disc passes the light source, the light source ceases to illuminate the transistor 63 which then returns to cut-off condition allowing capacitor 141 to charge as before. The charging voltage on capacitor 141 is the scanning voltage. The action of transistor 146 is to feed back into the base of the transistor 140 a small signal current which is amplified by transistor 140 acting as a common emitter amplifier. The amplified small current adds to the charging current previously described and thereby counteracts any tendency of the voltage across 141 to fail to rise linearly due to any current loss in the load resistance. This added current therefore is used to improve linearity of the scanning voltage. The amount of improvement is controlled by the size of the resistor 147 and the setting of the linearity adjustment potentiometer 148.

Of considerable importance in this invention is the particular paper which is used to obtain the markings. Ordinary paper alone is not satisfactory inasmuch as a suitable mark is not made about the hole formed by the spark. If untreated paper were to be used, the initial high voltage spark does volatilize into free radicals and ions a small amount of the cellulose. However, the amount of free ions due to this initial discharge across untreated paper is far below the minimum required to carry a low current arc capable of pyrolizing electrically the cellulose fibres. It may be noted that if there were not some degree of ionization there would be no discharge. Thus a specially impregnated paper should be used.

With respect to the paper or base web, it should first be porous or loosely woven. Non permeable materials such for example as a gelatin coated paper may require such a high volatge to be pierced as to be impractical. Of course a web having a very thin coating of non porous material may in some instances be pierced quite readily, and accordingly may be the electrical equivalent of a porous web. Since a loosely woven or porous paper is full of air passages but nevertheless is a dielectric, a spark discharge will pass through the air passages. Preferably the paper should be of such a porous nature as to pass an arc under a voltage differential of in the range of between 3000 and 4000 volts, although a voltage differential of up to 10,000 volts is satisfactory. Differentials far in excess of 10,000 volts in which category the highly calendered and coated papers fall are impractical and unwieldly. Thus relatively impermeable material such as heavily coated or calendered papers should not be used.

A slack-sized or lightly sized paper is satisfactory as a base web. A heavily calendered, thick paper whether sized or not will not work. On the other hand a heavily calendered thin paper which is fairly porous will work if there is sufficient porosity to permit passage of 10,000 volts.

It is clear that there is no critical delineation on the degree of porosity required in the base web. Where a somewhat greater voltage is available across the electrodes, the porosity may be somewhat less than where the voltage was less. As a guide to the degree of porosity reference is made to Baird and Trubesky (Tech Assoc.—paper 13, 274, May 1930) where they indicate the following table:

| Type of paper: | Pore and recess fraction percent by volume |
|---|---|
| Glassine | 13.0 |
| Bond | 34.2 |
| Greaseproof | 43.2 |
| News | 53.1 |
| Groundwood sheet | 63.1 |

Of the above listed papers, the latter two only are satisfactory, empirically indicating paper webs of less than approximately 45% pore and recess fraction by volume are unsatisfactory. Here it should be noted that we are principally concerned with true pores as distinguished from voids and recesses. Pores may be defined as openings which extend entirely through the sheet and which can act as air gaps for electrical discharge. Voids are spaces not connected to either surface. Recesses are openings connected to one surface only. Normally, the true pore volume of a typical paper may be approximately 1.6% of the total air fraction which may, as a reasonable maximum, extend to 70% of the total volume of the paper. Experimentally, a cotton fabric in the form of fine broadcloth has been found to have the necessary porosity for use.

Provided the paper has the required porosity, it may be formed of ground wood, soda, sulphite, rag, kraft pulp, bleached or unbleached, sized, slack-sized, unsized or a combination of the pulps mentioned. For ease in seeing markings, the paper preferably should be ordinary white of the type used in calculating machines or writing bond or book paper.

Preferably, however, the web should be unsized or slack-sized having a relatively smooth surface and preferably a thickness less than .010″. The most preferred form of the base web is a filter, blotting or other absorptive paper in the thickness of between .002″ and .005″. A satisfactory base paper would comprise a sulphite slack-sized bleached white relatively smooth paper of the thickness of .004″. This paper is dipped, roller coated, brushed or sprayed on one or both sides with an aqueous solution preferably saturated of an alkali metal salt having one of the following radicals:

Thiosulphate, nitrate, citrate, formaldehyde, sulfoxylate, bicarbonate, stannate, selenite, salicylate, acetate, molybdate, bisulfite, borate, chromate, cobaltinitrate, cyanide, nitrite, sulphide, glucuronate, carbonate, bitartarate, p-cymenesulfonate, formate.

Of the alkali metals, sodium and potassium are normally preferred with sodium, the preferred of these two. In addition to these alkali metal salts, cupric acetate, lead acetate, potassium sodium tartarate, lead nitrate and ferrous sulphate have been found satisfactory. Of a selective group of elements tested on a soft filter paper (Brosites Grade No. 752) for effectiveness in rendering a recorded visible mark, the following chart of relative effectiveness was noted where a grade of "0" indicated no visual record, a grade of "1" indicated a barely visible trace, a grade of "10" was equivalent to the marking rendered by the paper impregnated with a saturated sodium thiosulphate solution and other grades are proportionately intermediate in value dependent upon the intensity of the trace. It will be noted that in this listing no correction has been made for the difference in solubility of the different compounds:

*Table IA*

| Compound: | Intensity |
|---|---|
| Sodium thiosulfate | 10 |
| Lithium nitrate | 10 |
| Sodium citrate | 10 |
| Sodium formaldehyde sulfoxylate | 9 |
| Sodium bicarbonate | 9 |
| Sodium stannate | 9 |
| Sodium selenite | 9 |
| Cupric acetate (paper all blue) | 9 |
| Sodium salicylate | 8 |
| Sodium acetate | 7 |
| Lead acetate | 7 |
| Sodium molybdate | 7 |
| Sodium bisulfite | 7 |
| Sodium borate | 6 |
| Sodium chromate (orange background) | 6 |
| Potassium sodium tartarate | 6 |
| Lead nitrate | 5 |
| Sodium nitrate | 5 |
| Sodium glucuronate | 5 |
| Sodium carbonate | 4 |
| Sodium bitartarate | 4 |
| Sodium p-cymenesulfonate | 3 |
| Ferrous sulphate | 2 |

Tests were conducted on certain other compounds which were found to be relatively ineffective. They are:

*Table IB*

| Compound: | Intensity |
|---|---|
| Sodium chloride | 1 |
| Sodium sulphate | 1 |
| Lead chloride | 1 |
| Manganese sulphate | 1 |
| Sodium pyrophosphate | 1 |
| Potassium phosphate, tribasic | 0 |
| Potassium phosphate, dibasic | 0 |
| Sodium hypophosphite | 0 |
| Sodium iodide | 0 |
| Manganous borate | 0 |
| Ferric ammonium sulfate | 0 |
| Sodium bromide | 0 |
| Sodium silico flouride | 0 |
| Lead carbonate | 0 |
| Lead sulphate | 0 |
| Sodium oleate (applied from organic solvent solution) | 0 |

These reagents were of necessity empirically determined as suitable, as there is not necessarily any obvious correlation between the compounds tested. It will be noted for example that certain of the reagents have decided advantages over others. Thus sodium bicarbonate is not only much more effective in rendering a darkened spot than, for example, potassium nitrate, but is also much less expensive (by a factor of 8).

Each of these reagents should be used with a relatively bibulous paper and of the preferred type set forth. Further, the pH of the paper and reagent should be substantially neutral with a pH between pH 5.5 to pH 8. Of the group set forth above the best compounds are sodium thiosulphate, sodium bicarbonate and sodium citrate because of their relative excellent marking quality and inexpensive cost. Of this group sodium thiosulphate is somewhat more stable than the sodium bicarbonate under varying climatic conditions. However, the sodium bicarbonate is much less expensive than the sodium thiosulphate or sodium citrate and consequently a satisfactory paper can be made with a sodium bicarbonate at considerably less expense than sodium thiosulphate. As a matter of fact, sodium bicarbonate is the least expensive chemical of all the chemicals listed and consequently may be used to produce a very satisfactory and inexpensive recording paper. The amount of reagent in the aqueous solution may vary although for example in using sodium bicarbonate a saturated solution in water is preferred. However, for example, a solution of between 20% and 25% sodium thiosulphate by weight in water has been found satisfactory.

The paper after spraying, coating or impregnation is allowed to dry and is subsequently used in a dry state.

If desired the paper can be further treated to make it more flexible by incorporating into the aqueous solution a small amount of glycerine or sorbitol.

It is believed that of the materials set forth above, the more readily excited compounds are the best ones to use. All those specifically listed as tested are "readily excited" in an electric discharge. For example, lithium nitrate is more readily excited than sodium nitrate and as would be indicated leaves a darker mark. However, certain "readily excited" compounds such as sodium chloride are not satisfactory. This would indicate a selection could not be made solely from a chart of excitation levels of compounds, but must be made empirically as indicated.

It is believed that compounds producing either cations or anions as current carriers may be used. Compounds as sodium bicarbonate which produces both anions and cations are preferred as they produce more conductive ions or radicals in the gap between the electrodes.

Note particularly that the impregnated paper here produced does not depend upon an electrolytic conversion of a colorless compound to a colored compound. Any such discoloration which may occur to a slight degree, as for example with lead acetate, is incidental and of a "de minimus" quantity.

Moreover coatings which are melted to expose a darkened area or which swell under the action of heat are different in nature.

Further, prior art spark recorders which used merely a spark discharge without an intensified secondary current discharge will not visibly pyrolyze the paper.

Certain further observations may be made with respect to the paper and its impregnating material.

Highly hygroscopic impregnating compounds such as tribasic potassium phosphate make the paper too wet, particularly at high humidities, for satisfactory results, as the paper is made either conductive or alternately because the moisture in the paper uses the arc energy to evaporate, and therefore not enough energy remains to pyrolyze the cellulose.

Certain of the items listed have a rather peculiar combination effect. The acetate radicals in cupric acetate and lead acetate are good current carriers.

Further, both the lead and copper ions produce colored oxides.

In certain applications it may be desirable to make as fine a mark as possible. This may be done by using a more porous paper as a base sheet. The area about the hole is darkened ordinarily three times the size of the hole.

A synthetic polymer film providing interwall channels as indicated above may be satisfactory although perhaps expensive. Here the film would be treated with impregnants in a suitable manner to provide an equivalent structure to the porous impregnated paper.

As indicated above the impregnant is preferably applied from a saturated solution. However, solutions less than saturated have been found satisfactory. Thus, a saturated solution of sodium bicarbonate yielded an impregnation of:

.017 gram per square inch
or
.18 gram per gram of paper stock which was readily visible. The minimum useful concentration corresponding to "2" on the table resulted from an impregnation of sodium bicarbonate of .004 gram per square inch
or
.042 gram per gram of paper stock.

When the concentration was reduced to .0029 gram per square inch or .031 gram per gram of paper no visible mark was produced when tested. It would therefore appear that with respect to sodium bicarbonate an impregnation of at least approximately 4% sodium bicarbonate of the dry weight of the paper or alternately .004 gram per square inch of paper is satisfactory. Obviously however the amount as measured by the paper will vary somewhat with the thickness of the paper used.

The formation of crystaline structures on impregnation and drying of the paper should be avoided by controlling the concentration of the impregnant.

Note that the paper herein described is not sensitive to light, freezing, pressure, high humidity, high ambient weather or room temperature or storage. Thus, it may be used in varying climates without fading.

It should also be noted that the record produced may be duplicated by conventional means or may in the first instance be produced as a duplicate or triplicate record.

Figures 13, 15:
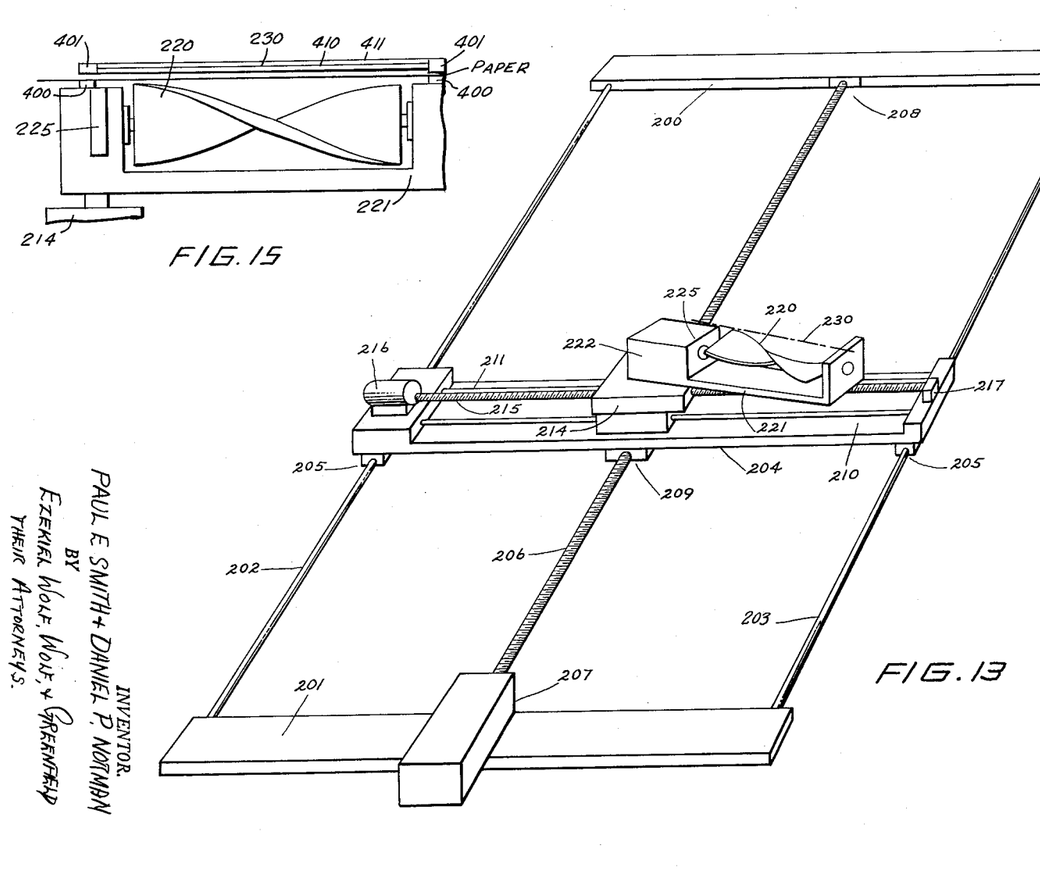
FIGURE 13 is a perspective view of a modification of the present invention particularly useful in a plotting system.
FIG. 15 is a fragmentary detail of the modification of FIG. 13.
Figure 14:
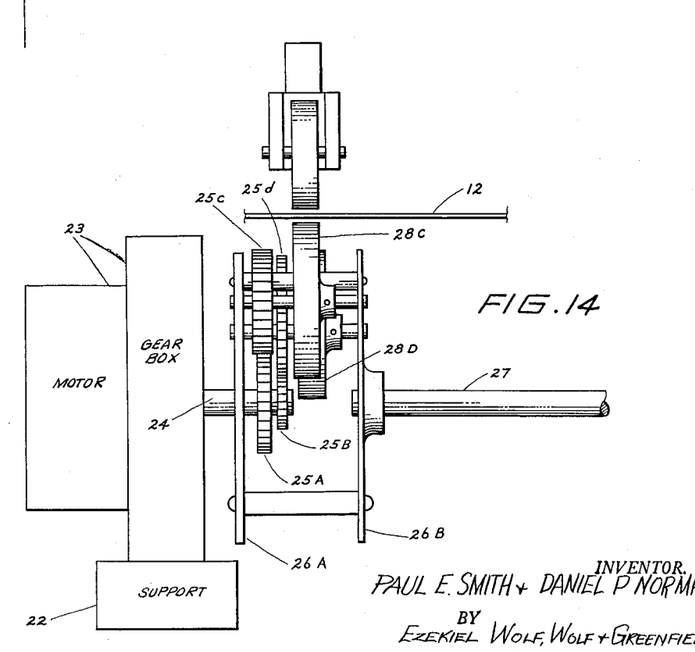
FIGURE 14 is a cross sectional detail taken along the line 14—14 of FIGURE 2.

In FIG. 13 there is shown a fragmentary representation of a particularly useful modification and application of the present invention. Here an arrangement is provided for marking charts and diagrams and particularly for use in a sonar tactical maneuver and navigation plotting system. In this arrangement a standard chart, as for example a standard navigational chart with suitable coordinates such as latitude and longitude is secured within a frame designed to keep it flat and taut and preferably under slight tension to prevent bowing of the chart. Preferably the frame should comprise opposite clamping elements for each side of the chart with the opposite portions of the clamp adapted to be readily opened for removal and insertion of new charts. The chart and frame are suitably mounted and secured by any conventional means above the scanning electrode positioning mechanism. This positioning mechanism includes end members 200 and 201 positioned parallel to one another and interconnected by parallel rails 202 and 203 which form a rectangular frame assembly. Slidably positioned on the rails 202 and 203 is a plotting carriage assembly 204. This assembly is mounted on low friction sliding bearings 205. Longitudinal motion to the carriage 204 is provided by a servo motor 207 which drives the lead screw 206. This lead screw extends parallel to the rails 202 and 203 and is supported in a bearing block 208 at the end remote from the servo motor 207. This lead screw engages the bearing 209 on the carriage 204 to produce latitudinal motion of the carriage. The carriage itself comprises a supporting base 210 which extends between the rails 202 and 203. Mounted upon this base is a pair of rails 211 and 212 which extend transversely from one end of the carriage to the other. A scanning electrode carriage 214 is mounted on low friction sliding bearings in turn slidably mounted on the rails 211 and 212. Longitudinal motion to this carriage 214 is provided by a longitudinal lead screw 215 which extends parallel to the rails 211 and 212. The lead screw 215 is driven by a longitudinal motion servo motor 216. This lead screw 215 is journaled in a bearing block 217 at one end and engages the carriage 214 intermediate the ends of the lead screw. Mounted upon the carriage 214 is the helical scanning electrode 220 which corresponds in construction to the scanning electrode previously described. This electrode 220 is mounted in a suitable support 221 for rotation by means of controls of the type previously described. This support 221 is mounted for rotation on the carriage 214 about a point which corresponds to the point on the scanning electrode at which the emitting signal is in time emitted. Where this system is used for navigational plotting or tactical manoeuvering, the point 225 corresponds to own ships position and the rotation of the support 221 is servoed by any conventional means not shown to the angle of the sonar or radar transmitter receiver unit so that support 221 and the axis of the helix is headed on the chart parallel to the true heading of the transmitter receiver. The motor for rotating the helix electrode 220 may be mounted adjacent and within the same casing as motor 222 which rotates and properly aligns the carriage 221. A fixed electrode 225 which is coaxial the axis of rotation of the carriage 221 is utilized to indicate the ships own position and may be referred to as the fixed electrode. It will be noted that the fixed electrode is positioned just below the chart. An upper electrode 230 consisting of a length of wire or strip of metal 410 suitably suspended in a frame 411 is maintained above and parallel to the axis of revolution of the helix electrode 220 by means of permanent magnets 400, 401 positioned in the carriage and on the upper electrode frame. By this arrangement the upper electrode 230 moves with the carriage 204 and rotates with the carriage 221. The electronics of the circuits utilized in this arrangement are similar to those previously described with the output from the transformer connected across the fixed electrode 225 and the helix scanning electrode 220.

Thus this system operates in the following manner. The carriages 204 and 214 are moved in latitudinal and longitudinal directions to correspond with the ships own position with the servo motors 207 and 216 being suitably controlled by a suitable servo mechanism not shown. In addition the helix carriage 221 is rotated so that the longitudinal axis of the helix is parallel to the direction of the sonar beam and hence to the angle between own ship and target. A single servo mechanism not shown may be utilized to assure a rotation of the carriage 221 in correspondence with the rotation of the sonar transmitter-receiver.

The time required for a pulse emitted from the sonar transmitter receiver to travel from own ship to target and return is a measure of the range. The time required by the point of intersection of the revolving helix scanning electrode 220 and the parallel spaced upper electrode 230 to travel from one end of the electrode to the other is also fixed. The transmitted pulse of the sonar transmitter receiver unit is adjusted to be emitted at the instant the point of intersection of the scanning electrode leaves own ships position as determined by the fixed electrode 225. Thus, since the pulse which is emitted is a measure of the distance to the target and back and as the pulse will then be applied to the point of intersection at some point along the upper electrode dependent upon the time of emission and return of the pulse, the point at which the return pulse will be applied to the upper electrode is a direct measure of range. When the return pulse is applied to the scanning electrode, at some time at which the point of intersection is remote from the fixed electrode a complete circuit will be created through the upper electrode. Here the gaps between the scanning electrode and the upper electrode at the point of intersection will break down at substantially the same time the closest point of the upper electrode and the fixed electrode breaks down. When this breakdown occurs, a conducting path exists through which current from a spark intensifying circuit of the type previously described flows supplying sufficient current to produce substantially simultaneously two visible dots on the suitably impregnated chart paper. One of these dots is at own ships position and the other at target position.

Having now described our invention, we claim:

1. In a combination of a recording device having a pair of electrodes and a paper positioned between said electrodes, means for maintaining said electrodes spaced from said paper and said paper having a thickness of substantially no more than .010 comprising a base sheet of absorptive paper having a pore and recess fraction percent by volume greater than substantially 45% wherein the true pore volume is approximately 1.6% of said fraction impregnated with sodium bicarbonate.

2. In a combination of a recording device having a pair of electrodes and a paper positioned between said electrodes, means for maintaining said electrodes spaced from said paper and said paper having a thickness of substantially no more than .010 comprising a base sheet of absorptive paper having a pore and recess fraction percent by volume greater than substantially 45% wherein the true pore volume is approximately 1.6% of said fraction impregnated with an aqueous solution of substantially no less than 20% sodium thiosulphate.

3. In a combination of a recording device having a pair of electrodes and a paper positioned between said electrodes, means for maintaining said electrodes spaced from said paper, said paper comprising a base sheet of absorptive paper having a pore and recess fraction percent by volume greater than substantially 45% having a thickness of substantially no more than 0.010" wherein the true pore volume is approximately 1.6% of said fraction impregnated with one of a group of aqueous substantially saturated solutions of a sodium salt reagent consisting of the sodium salts of thiosulphate, bicarbonate, citrate, cobaltnitrate, cyanide, nitrate, nitrite, sulphide, formate salicylate and tartarate.

4. A recorder having a pair of spaced electrodes adapted to have recording paper pass therebetween, means for creating a spark between said electrodes by applying a sparking voltage across said electrodes and means in parallel with said last mentioned means for applying immediately subsequently to said sparking voltage an increased voltage adapted to cause a current surge through said spark caused by said sparking voltage.

5. In a device for navigational plotting the combination of a recording chart, a helical rotatable electrode and a second electrode longitudinally aligned therewith, positioned below the chart, and a third elongated electrode positioned above the chart in parallel alignment with said other two electrodes, having a length substantially coextensive with the distance between the remote ends of said other two electrodes, and means for maintaining said third electrode parallel to said helical electrode.

6. A device as set forth in claim 5 providing means mounting said helical electrode for rotation about said second electrode as an axis.

7. In a recorder device having a pair of spaced electrodes between which a web of recording material is adapted to be passed, means for applying a voltage potential sufficient to establish an arc between said electrodes and through said web, auxiliary means in parallel with said first mentioned means adapted to pass current through a path established by said arc of substantially greater magnitude than the current caused by said voltage potential, and means for triggering said second mentioned means immediately on establishing said arc.

8. Recording apparatus comprising a means for advancing a dry sheet of porous record material, a pair of electrodes at either side of the sheet in spaced relationship thereto, means for moving at least one of the electrodes so that the closest interval between them traverses the sheet, means for measuring an electric potential corresponding to the instantaneous values of a variable, means responsive thereto to apply at a related position of opposition of the electrodes a potential effective to cause discharge between them to perforate the paper, and means sequentially operated to increase the current along the path of discharge to char the margins of the perforation.

9. A paper adapted to be perforated and marked by electrical means comprising a base sheet of absorptive porous paper having a thickness of substantially no more than .010" and, having a pore and recess fraction percent by volume greater than substantially 45%, wherein the true pore or volume is approximately 1.6% of said fraction impregnated with an alkali metal bicarbonate salt.

10. A paper adapted to be perforated and marked by electrical means comprising a base sheet of absorptive porous unsized or slack sized paper having a pore and recess fraction percent by volume greater than substantially 45% wherein the true pore or volume is approximately 1.6% of said fraction and having a thickness of substantially no more than .010" impregnated with an alkali metal salt having a radical selected from one of a group consisting of thiosulphate, bicarbonate, citrate cobaltnitrate, cyanide, nitrate, nitrite, sulphide, formate, salicylate, bitartarate, formaldehyde sulfoxylate, stannate, selanite, acetate, molybdate, bisulphite, borate, chromate, glucuronate, carbonate, sulphate, tartarate, and p-cymenesulfonate.

11. A paper adapted to be perforated and marked by electrical recording means comprising a base sheet of absorptive porous paper having a thickness of substantially no more than .010 and, having a pore and recess fraction percent by volume greater than substantially 45% wherein the true pore or volume is approximately 1.6% of said fraction impregnated with an aqueous saturated solution of bicarbonate salt of an alkali metal.

12. A recording paper for use in electrical recording means comprising a dry base sheet of absorptive having a thickness of substantially no more than .010 and, paper having passages extending therefrom in one surface to the other, and having a pore and recess fraction percent by volume greater than substantially 45%, wherein the true pore or volume is approximately 1.6% of said fraction and impregnated with an alkali metal salt reagent having a radical selected from one of a group consisting of thiosulphate, bicarbonate, citrate, cobaltnitrate, cyanide nitrate, nitrite, sulphide, formate, salicylate, bitartarate, formaldehyde, sulfoxylate, stannate, selenite, acetate, molybdate, bisulfite, borate, chromate, glucuronate, carbonate, sulphate, tartarate, and p-cymenesulfonate.

13. A dry paper adapted to be perforated and visibly darkened by an electrical current comprising a base sheet of absorptive paper having a thickness of substantially no more than .010 and, having a pore and recess fraction percent by volume greater than substantially 45% wherein the true pore or volume is approximately 1.6% of said fraction impregnated with an aqueous solution of substantially no less than 20% sodium thiosulphate.

14. A paper as set forth in claim 13, wherein said recording paper is electrically non-conductive.

15. In combination of a recording device having a pair of electrodes and a paper positioned between said electrodes, means for maintaining said electrodes spaced from said paper and said paper having a thickness of substantially no more than .010 and, comprising a base sheet of absorptive paper having a pore and recess fraction percent by volume greater than substantially 45% wherein the true pore or volume is approximately 1.6% of said fraction impregnated with an alkali metal salt having a radical selected from one of a group consisting of thiosulphate, bicarbonate, citrate, cobaltnitrate, cyanide, nitrate, nitrite, sulphide, formate, salicylate, bitartarate, formaldehyde, sulfoxylate, stannate, selenite, acetate, molybdate, bisulphite, borate, chromate, glucuronate, carbonate, sulphate, tartarate, and p-cymenesulfonate.

16. In combination a recorder having a helical electrode and fixed electrode parallel thereto, a substantially thermally and electrically non-conductive paper treated with an alkali metal salt reagent having an ion selected from one of a group consisting of thiosulphate, bicarbonate, citrate, cobaltnitrate, cyanide, nitrate, nitrite, sulphide, formate, salicylate, bitartarate, formaldehyde, sulfoxylate, stannate, selenite, acetate, molybdate, bisulphite, borate, chromate, glucuronate, carbonate, sulphate, tartarate, and p-cymenesulfonate positioned between electrodes, means for maintaining said paper spaced from said electrodes, means for creating an arc between said electrodes by applying an arcing voltage across said electrode and through said paper and means electrically in parallel with said last mentioned means for applying immediately subsequent to said arcing voltage a current surge through said arc caused by said arcing voltage.

17. In a device for navigational plotting, the combination of a recording chart, a helical rotatable electrode and a second fixed electrode aligned therewith, said helical and fixed electrode positioned below the chart, a third elongated electrode positioned above the chart substantially colinear and in parallel alignment with said other two electrodes, means for rotating said helical electrode so that the closest point between said helical and third electrodes moves across said chart in a direction from said second electrode, and means for creating a potential differential between said third electrode and said other electrodes having spark discharges sufficient to puncture said chart which occur substantially simultaneously between said third electrode and said second electrode and between said third electrode and said point on said helical electrode.

18. In a device for navigational plotting, the combination of a recording chart, a helical rotatable electrode and a second electrode longitudinally aligned therewith, positioned below the chart, and a third elongated electrode positioned above the chart in parallel alignment with said other two electrodes, having a length substantially coextensive with the distance between the remote ends of said other two electrodes, means for maintaining said third electrode parallel to said helical electrode, means mounting said helical electrode for rotation above said second electrode as an axis, means for moving said mounting means in two directions mutually perpendicular, and input means responsive to input signals for selectively actuating said moving means.

19. A means for recording voltages indicative of values of a variable condition which comprises a pair of electrodes, means for traversing a recording sheet between said electrodes, means for causing a point of opposition between the electrodes to travel across the paper transversely to its direction of movement, means for establishing a progressively increasing voltage with such movement, means for measuring an instantaneous voltage corresponding to a value of a variable means for comparing with said voltage the instantaneous voltage and creating a pulse when the two voltages are identical corresponding to a certain position of said point and means responsive to said pulse to cause an arc discharge between the electrodes effective to form a minute hole through the paper and means for immediately thereafter increasing the current to cause charring of the margin of said hole.

20. A sheet of material adapted to be marked by electrical means comprising a porous permeable, cellulose web having a thickness of substantially no more than .010 having a pore and recess fraction per cent by volume greater than substantially 45% wherein the true pore volume is approximately 1.6% of said fraction impregnated with an alkali metal salt reagent having a radical selected from a group consisting of thiosulphate, bicarbonate, citrate, cobaltnitrate, cyanide, nitrate, nitrite, sulphide, fornate, salicylate, bitartarate, formaldehyde, sulfoxylate, stannate, acetate, molybdate, bisulfite, borate, chromate, glucoronate, carbonate, sulphate, tartarate, and p-cymenesulfornate.

21. A sheet as set forth in claim 20 wherein said sheet is adapted to pass an arc under a voltage of up to substantially 10,000 volts.

22. A paper as set forth in claim 12, wherein said sheet is of a thickness of between substantially .002" and .005".

23. A paper adapted to be perforated and marked by electrical means comprising a base sheet of absorptive porous paper having a thickness of substantially no more than .010 having a pore and recess fraction percent by volume greater than substantially 45% wherein the true pore volume is approximately 1.6% of said fraction impregnated with an alkali metal citrate salt.

24. A device as set forth in claim 18 providing a frame within which said chart is secured, said frame having means for rigidly securing said chart.

25. In combination, a recording paper, a pair of parallelly aligned electrodes positioned one on either side of said paper, means mounting each of said electrodes, a pair of mutually attracting and magnetic means, means securing one each of said pair to one each of said electrodes whereby said electrodes are maintained in fixed relation.

26. In combination, a pair of parallel elongated electrodes with one of said electrodes comprising a helical electrode, means mounting said helical electrode for rotation and physical displacement, a recording medium interposed between said electrodes, and magnetic means mounted in part on said mounting means and in part engaging the other of said electrodes for maintaining said electrodes in fixed parallel relation.

27. In a recorder device having a pair of spaced electrodes and closely adjacent to which a web of recording material is adapted to be passed, means for applying a voltage potential sufficient to establish an arc between said electrodes which arc heats said web, auxiliary means in parallel with said first-mentioned means adapted to pass current through a path established by said arc of substantially greater magnitude than the current caused by said voltage potential, and means for triggering said second-mentioned means immediately upon establishing said arc.

28. A means for recording voltages indicative of values of a variable condition which comprises a pair of electrodes, means for traversing a recording sheet closely adjacent to said electrodes, means for causing a point of opposition between the electrodes to travel across the paper transversely to its direction of movement, means for establishing a progressively increasing voltage with such movement, means for measuring an instantaneous voltage corresponding to a value of a variable, means for comparing with said voltage the instantaneous voltage and creating a pulse when the two voltages are identical corresponding to a certain position of said point, means responsive to said pulse to cause an arc discharge between the electrodes effective to heat a point on the paper, and means for immediately thereafter increasing the current in said arc discharge to cause charring of said heated point.

(References on following page)

References Cited in the file of this patent

UNITED STATES PATENTS

| | | |
|---|---|---|
| 671,548 | Gordon | Apr. 9, 1901 |
| 1,097,131 | Kitsee | May 19, 1914 |
| 1,943,746 | Simmons | Jan. 16, 1934 |
| 2,151,936 | Pflugner et al. | Mar. 28, 1939 |
| 2,480,890 | Tribble | Sept. 6, 1949 |
| 2,596,118 | Bischoff et al. | May 13, 1952 |
| 2,596,741 | Tyler et al. | May 13, 1952 |
| 2,631,918 | Kozak | Mar. 17, 1953 |
| 2,635,032 | Shea | Apr. 14, 1953 |
| 2,647,033 | Faus | July 28, 1953 |
| 2,718,448 | Powers | Sept. 20, 1955 |
| 2,729,818 | Bell et al. | Jan. 10, 1956 |
| 2,739,865 | Willey | Apr. 21, 1956 |
| 2,759,783 | Ross | Apr. 21, 1956 |
| 2,750,247 | Turner | June 12, 1956 |
| 2,812,445 | Anderson | Nov. 5, 1957 |
| 2,831,987 | Jones | Apr. 22, 1958 |
| 2,853,629 | Felker | Sept. 23, 1958 |

FOREIGN PATENTS

| | | |
|---|---|---|
| 624,738 | Great Britain | June 15, 1949 |
| 161,559 | Australia | Mar. 1, 1955 |
| 150,118 | Sweden | May 24, 1955 |

OTHER REFERENCES

Dolan: "Chemistry and Industry," Apr. 26, 1952 (pages 368–371).